(12) United States Patent
Yoda et al.

(10) Patent No.: US 11,994,417 B2
(45) Date of Patent: *May 28, 2024

(54) UTILITY POLE DETERIORATION DETECTION SYSTEM, UTILITY POLE DETERIORATION DETECTION APPARATUS, UTILITY POLE DETERIORATION DETECTION METHOD, AND NON-TRANSITORY COMPUTER READABLE MEDIUM

(71) Applicant: NEC Corporation, Tokyo (JP)

(72) Inventors: Yukihide Yoda, Tokyo (JP); Yoshiaki Aono, Tokyo (JP); Koji Asahi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 475 days.

This patent is subject to a terminal disclaimer.

(21) Appl. No.: 17/270,333

(22) PCT Filed: Apr. 23, 2019

(86) PCT No.: PCT/JP2019/017272
§ 371 (c)(1),
(2) Date: Feb. 22, 2021

(87) PCT Pub. No.: WO2020/044655
PCT Pub. Date: Mar. 5, 2020

(65) Prior Publication Data
US 2021/0247215 A1 Aug. 12, 2021

(30) Foreign Application Priority Data
Aug. 30, 2018 (JP) ................................. 2018-162042

(51) Int. Cl.
*G01D 5/353* (2006.01)
*G01N 21/952* (2006.01)

(52) U.S. Cl.
CPC ........... *G01D 5/353* (2013.01); *G01N 21/952* (2013.01); *G01N 2201/088* (2013.01)

(58) Field of Classification Search
CPC .. G01D 5/353; G01D 5/35358; G01N 21/952; G01N 2201/088; G02B 6/48; H02G 1/02
(Continued)

(56) References Cited

U.S. PATENT DOCUMENTS 4,846,547 A * 7/1989 Falco ........................ G01K 5/72
385/28
9,983,313 B2 * 5/2018 Knibbe .................... G01S 19/14
(Continued)

FOREIGN PATENT DOCUMENTS

CN 103925984 A 7/2014
CN 104121982 A 10/2014
(Continued)

OTHER PUBLICATIONS

Japanese Office Communication for JP Application No. 2020-540050 dated Jul. 26, 2022 with English Translation.
International Search Report for PCT Application No. PCT/JP2019/017272, dated Jul. 9, 2019.
Wang Hongjun, "Knowledge-based Electromechanical System Fault Diagnosis and Prediction Technology", China Fortune Press, Jan. 31, 2014, 5 pages total.
(Continued)

*Primary Examiner* — Tri T Ton

(57) ABSTRACT

A utility pole deterioration detection system includes a cable (20) disposed in a utility pole (10), the cable (20) containing a communication optical fiber, a receiving unit (331) configured to receive an optical signal containing a pattern that changes according to a deterioration state of the utility pole (10) from at least one optical fiber contained in the cable (20), and a detection unit (332) configured to detect a deterioration state of the utility pole (10) based on the pattern.

11 Claims, 16 Drawing Sheets

(58) Field of Classification Search
USPC .............. 356/237.1–237.6, 239.1–239.8
See application file for complete search history.

(56) References Cited

U.S. PATENT DOCUMENTS

| | | | |
|---|---|---|---|
| 2006/0071776 A1* | 4/2006 | White, II | H04B 3/546 340/538 |
| 2014/0278150 A1* | 9/2014 | Baesler | E04H 12/00 702/34 |
| 2018/0195883 A1* | 7/2018 | Geiger | G01H 9/004 |

FOREIGN PATENT DOCUMENTS

| | | | |
|---|---|---|---|
| CN | 104483007 A | 4/2015 | |
| CN | 104121889 B | 4/2016 | |
| CN | 107113026 A | 8/2017 | |
| JP | H05-209809 A | 8/1993 | |
| JP | 2002-152937 A | 5/2002 | |
| JP | 2004-333213 A | 11/2004 | |
| JP | 2006-194891 A | 7/2006 | |
| JP | 2006-226716 A | 8/2006 | |
| JP | 2006-338577 A | 12/2006 | |
| JP | 2007-183166 A | 7/2007 | |
| JP | 2008-067457 A | 3/2008 | |
| JP | 2008-67467 A | 3/2008 | |
| JP | 2009-229070 A | 10/2009 | |
| JP | 2010-071748 A | 4/2010 | |
| JP | 2013-072800 A | 4/2013 | |
| JP | 2014-502345 A | 1/2014 | |
| JP | 2015-53832 A | 3/2015 | |
| JP | 2018-074757 A | 5/2018 | |
| JP | 2018-96866 A | 6/2018 | |

OTHER PUBLICATIONS

Communication dated May 12, 2023 issued by the State Intellectual Property Office of P.R. China in counterpart Chinese application No. 201980055341.X.

Extended European Search Report for EP Application No. 19854690.5 dated Sep. 8, 2021.

Udd E et al: "Fiber Grating Systems Used to Measure Strain in Cylindrical Structures", Optical Engineering, Soc. of Photo-Optical Instrumentation Engineers, vol. 36, No. 7, Jul. 1. 1997, pp. 1893-1900.

JP Office Action for JP Application No. 2020-540050, dated Jun. 20, 2023 with English Translation.

Kengo Koizumi, Jin Murai, Distribution Optical Fiber Sensing Technology for Society's Infrastructure Monitoring, OKI Technical Review, Japan, Dec. 2015, Issue 226, vol. 82, No. 2, pp. 32-35.

Japanese Office Action for JP Application No. 2020-540050, mailed on Mar. 5, 2024 with English Translation.

Masuo Kado et al., "Long term continuous monitoring of structures by optical fiber sensors"Journal of Applied Mechanics vol. 6, Japan Society of Civil Engineers (Aug. 2003), pp. 1105-1112.

Hiroshi Naruse, "Structure Monitoring by Optical Fiber", Journal of the Japan Society of Machinery, Mar. 2006, vol. 109, No. 1048, pp. 22-23.

Wu et al., "Review on Structural Health Monitoring for Infrastructure" Journal of Applied Mechanics vol. 6, Japan Society of Civil Engineers, Aug. 2003, pp. 1043-1054,.

Yotaro Kubo " Deep Learning for Pattern Recognition", IPSJ Magazine vol. 54, No. 5, pp. 500-508, May 2013.

* cited by examiner

| UTILITY POLE NUMBER | DISTANCE FROM FIBER SENSING UNIT |
|---|---|
| A | xx km |
| B | yy km |
| C | zz km |

Fig. 2

| UTILITY POLE NUMBER | DETERIORATION STATE OF UTILITY POLE |
|---|---|
| A | NORMAL |
| B | DETERIORATION LEVEL 1 |
| C | DETERIORATION LEVEL 2 |

| UTILITY POLE NUMBER | DISTANCE FROM FIBER SENSING UNIT | MATERIAL | HEIGHT | YEAR OF CONSTRUCTION |
|---|---|---|---|---|
| A | xx km | STEEL PIPE | 10 m | 50 |
| B | yy km | STEEL PIPE | 20 m | 15 |
| C | zz km | CONCRETE | 30 m | 80 |

Fig. 12

UTILITY POLE DETERIORATION DETECTION SYSTEM, UTILITY POLE DETERIORATION DETECTION APPARATUS, UTILITY POLE DETERIORATION DETECTION METHOD, AND NON-TRANSITORY COMPUTER READABLE MEDIUM

This application is a National Stage Entry of PCT/JP2019/017272 filed on Apr. 23, 2019, which claims priority from Japanese Patent Application 2018-162042 filed on Aug. 30, 2018, the contents of all of which are incorporated herein by reference, in their entirety.

TECHNICAL FIELD

The present disclosure relates to a utility pole deterioration detection system, a utility pole deterioration detection apparatus, a utility pole deterioration detection method, and a non-transitory computer readable medium.

BACKGROUND ART

Conventionally, abnormalities of utility poles are often detected manually. For example, a worker determines an abnormality only by a visual observation, or taps on a utility pole and determines an abnormality based on reverberating sound or the like. However, when an abnormality of a utility pole is manually detected, it takes large amounts of time and cost, and thus in some cases, detecting an abnormality and coping therewith are delayed.

Therefore, recently, a system for monitoring a utility pole for detecting an abnormality thereof by using an optical fiber has been proposed (e.g., Patent Literatures 1 and 2).

In a technique disclosed in Patent Literature 1, an optical fiber is linearly or spirally disposed in the vertical direction of a utility pole. When a utility pole is broken by a collision of an automobile with the utility pole, the optical fiber is severely bent, so that a loss occurs in an optical signal propagating through the inside of the optical fiber. In this way, it is detected that one of a plurality of utility poles has been broken by detecting the amount of a loss caused by the above-described loss through OTDR (Optical Time-Domain Reflectometry) measurement.

Further, in a technique disclosed in Patent Literature 2, a nesting detection core line, which is composed of an optical fiber for detecting nesting in a utility pole, is disposed. When the nesting detection core line is warped due to nesting in the utility pole, the nesting detection core line is distorted, e.g., is bent or stretched, so that the strength of an optical signal propagating through the inside of the nesting detection core line is attenuated. As a result, it is detected that a nest has been made by detecting the amount of a loss caused by this attenuation through OTDR measurement.

CITATION LIST

Patent Literature

Patent Literature 1: Japanese Unexamined Patent Application Publication No. 2008-067467
Patent Literature 2: Japanese Unexamined Patent Application Publication No. 2015-053832

SUMMARY OF INVENTION

Technical Problem

Incidentally, in the techniques disclosed in Patent Literatures 1 and 2, an abnormality of a utility pole is detected by monitoring the amount of a loss in an optical signal that is caused when a strong stress is exerted on an optical fiber.

Therefore, there is a problem that although it is possible to detect an extreme state such as nesting in the utility pole or a breakage thereof, it is very difficult to detect a state that hardly affects the stress on the optical fiber.

Therefore, an object of the present disclosure is to solve the above-described problem and to provide a utility pole deterioration detection system, a utility pole deterioration detection apparatus, a utility pole deterioration detection method, and a non-transitory computer readable medium capable of accurately detecting a deterioration state of a utility pole.

Solution to Problem

A utility pole deterioration detection system according to one aspect includes:
  a cable disposed in a utility pole, the cable containing a communication optical fiber;
  a receiving unit configured to receive an optical signal containing a pattern that changes according to a deterioration state of the utility pole from at least one communication optical fiber contained in the cable; and
  a detection unit configured to detect a deterioration state of the utility pole based on the pattern.

A utility pole deterioration detection apparatus according to another aspect includes:
  a receiving unit configured to receive an optical signal containing a pattern that changes according to a deterioration state of a utility pole from at least one communication optical fiber contained in a cable disposed in the utility pole; and
  a detection unit configured to detect a deterioration state of the utility pole based on the pattern.

A utility pole deterioration detection method according to another aspect is a utility pole deterioration detection method performed by a utility pole deterioration detection apparatus, including:
  receiving an optical signal containing a pattern that changes according to a deterioration state of a utility pole from at least one communication optical fiber contained in a cable disposed in the utility pole; and
  detecting a deterioration state of the utility pole based on the pattern.

A non-transitory computer readable medium according to another aspect is a non-transitory computer readable medium storing a program for causing a computer to perform:
  a process of receiving an optical signal containing a pattern that changes according to a deterioration state of a utility pole from at least one communication optical fiber contained in a cable disposed in the utility pole; and
  a process of detecting a deterioration state of the utility pole based on the pattern.

Advantageous Effects of Invention

According to the above-described aspect, it is possible to achieve an advantageous effect that the deterioration state of a utility pole can be accurately detected.

BRIEF DESCRIPTION OF DRAWINGS

FIG. 2 shows an example of utility pole information according to an example embodiment;

FIG. 12 shows an example of utility pole information according to another example embodiment;

DESCRIPTION OF EMBODIMENTS

Example embodiments according to the present disclosure will be described hereinafter with reference to the drawings.

Example Embodiment

Configuration of Example Embodiment

Firstly, a configuration of a utility pole deterioration detection system according to this example embodiment will be described with reference to FIG. 1. Note that, in FIG. 1, only three utility poles 10 are shown for simplifying the explanation. Further, the three utility poles 10 are indicated by utility pole numbers A, B and C, respectively.

Figure 1:
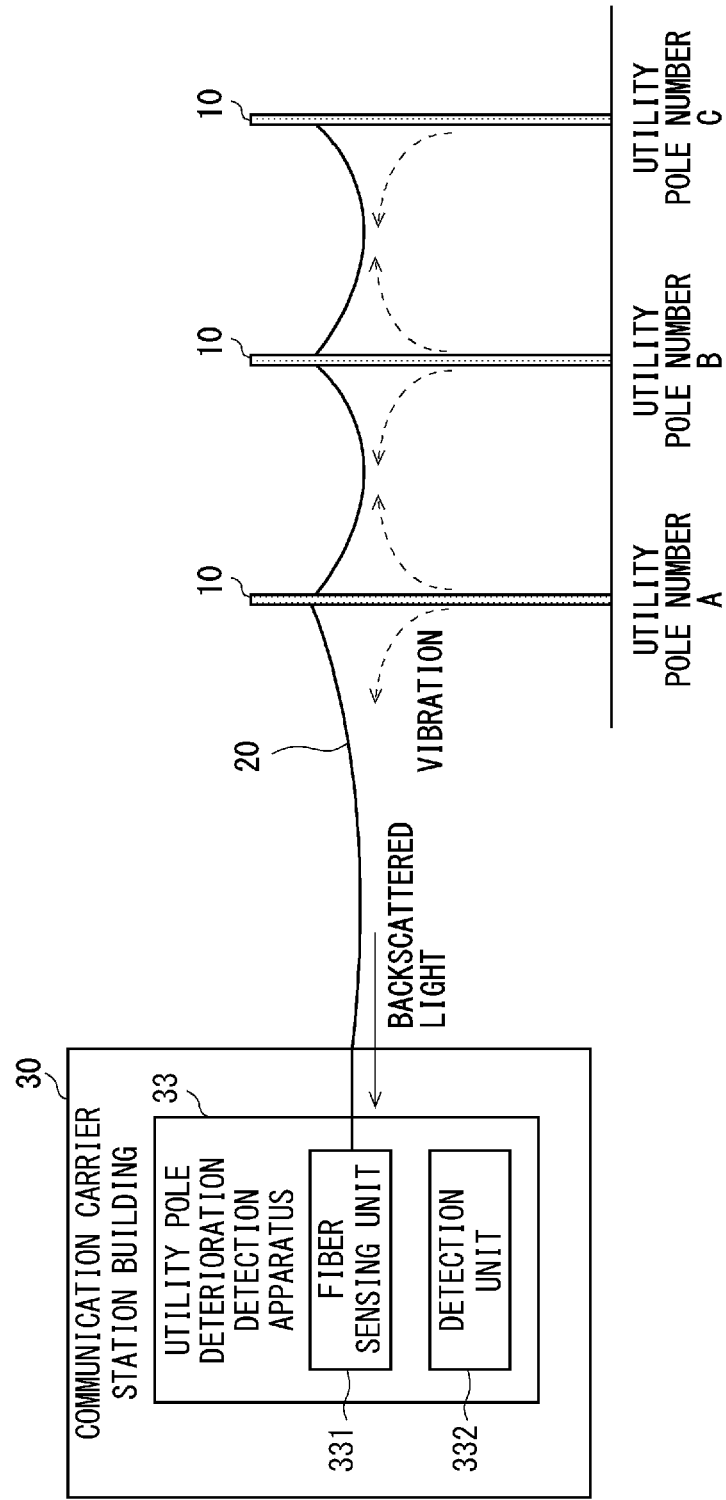
FIG. 1 shows an example of a configuration of a utility pole deterioration detection system according to an example embodiment.

As shown in FIG. 1, the utility pole deterioration detection system according to this example embodiment is a system for detecting a deterioration state of a utility pole 10, and includes an optical fiber cable 20 and a utility pole deterioration detection apparatus 33.

The optical fiber cable 20 is strung (e.g., stretched) through the utility poles 10. When the optical fiber cable 20 is strung through the utility poles 10, it is strung (e.g., stretched) substantially perpendicular to the longitudinal direction of the utility poles 10.

The optical fiber cable 20 is a cable that is formed by covering at least one communication optical fiber with a sheath. One end of the optical fiber cable 20 is routed to the inside of a communication carrier station building 30, and the other end thereof is terminated at the utility pole 10 having the utility pole number C.

The utility pole deterioration detection system according to this example embodiment detects the deterioration state of the utility pole 10 by using an optical fiber sensing technique in which the optical fiber is used as a sensor.

Specifically, pulsed light is made to enter the communication optical fiber contained in the optical fiber cable 20 inside the communication carrier station building 30. As a result, as the pulsed light is transmitted through the communication optical fiber toward the utility poles 10, backscattered light is generated each time the pulsed light travels a certain transmission distance. The backscattered light returns to the inside of the communication carrier station building 30 through the same communication optical fiber.

Note that the utility poles 10 vibrate due to disturbances from the surrounding environment or naturally vibrate, and the vibrations of the utility poles 10 are transmitted to the communication optical fiber. Further, the vibration pattern of the utility pole 10 changes according to the deterioration state of that utility pole 10.

Therefore, the backscattered light returning to the inside of the communication carrier station building 30 contains a pattern that changes according to the deterioration state of the utility pole 10. In the example shown in FIG. 1, since the three utility poles 10 are provided, the backscattered light returning to the inside of the communication carrier station building 30 contains patterns each of which changes according to the deterioration state of a respective one of the three utility poles 10.

The utility pole deterioration detection system according to this embodiment detects the deterioration state of a utility pole 10 by utilizing the fact that the backscattered light returning to the inside of the communication carrier station building 30 contains a pattern that changes according to the deterioration state of that utility pole 10.

Note that the above-described utility pole deterioration detection apparatus 33 is provided inside the communication carrier station building 30. The utility pole deterioration detection apparatus 33 is equipment that is newly installed in order to implement this example embodiment.

The utility pole deterioration detection apparatus 33 has a function of detecting the deterioration state of the utility pole 10 in addition to the functions as the optical fiber sensing apparatus. Specifically, the utility pole deterioration detection apparatus 33 includes a fiber sensing unit 331 and a detection unit 332. The fiber sensing unit 331 is an example of the receiving unit.

The fiber sensing unit 331 makes pulsed light enter at least one communication optical fiber contained in the optical fiber cable 20. This pulsed light is transmitted toward the utility poles 10. Further, the fiber sensing unit 331 receives backscattered light of the pulsed light from the same communication optical fiber to which the pulsed light has entered. This backscattered light is received in the direction from the utility poles 10.

Note that, as described above, the backscattered light received by the fiber sensing unit 331 contains the patterns that change according to the deterioration states of the utility poles 10.

Therefore, the detection unit 332 detects the deterioration states of utility poles 10 based on the patterns that change according to the deterioration states of those utility poles 10 and are contained in the backscattered light received by the fiber sensing unit 331.

Note that, in the example shown in FIG. 1, since the three utility poles 10 are provided, the fiber sensing unit 331 receives backscattered lights containing patterns each of which changes according to the deterioration state of a respective one of the three utility poles 10 in a chronological manner.

Therefore, when the fiber sensing unit 331 receives backscattered light containing a pattern that changes according to the deteriorated state of a utility poles 10, it first identifies the utility pole 10 in which the backscattered light was generated. Then, the detection unit 332 detects the deterioration state of the utility pole 10 identified by the fiber sensing unit 331.

Therefore, a method for identifying, when the fiber sensing unit 331 receives backscattered light containing a pattern that changes according to the deterioration state of a utility pole 10, the utility pole 10 in which that backscattered light was generated will be described hereinafter.

In this example embodiment, the fiber sensing unit 331 holds utility pole information including location information indicating the location of each utility pole 10 in advance. FIG. 2 shows an example of the utility pole information. Note that, in FIG. 2, a relation zz>yy>xx holds. The detection unit 332 calculates a generation point where backscattered light containing a pattern that changes according to the deterioration state of a utility pole 10 was generated based on a time difference between a time when the fiber sensing unit 331 made pulsed light enter the communication optical fiber and a time when it received that backscattered light from the same communication optical fiber. Note that the fiber sensing unit 331 calculates the generation point in such a manner that the smaller the above-described time difference is, the closer the generation point is to the fiber sensing unit 331. Then, the fiber sensing unit 331 identifies the utility pole 10 where the backscattered light was generated by referring to the utility pole information shown in FIG. 2.

In the example shown in FIG. 1, the fiber sensing unit 331 receives backscattered lights containing patterns each of which changes according to the deterioration state of a respective one of the three utility poles 10 in a chronological manner. Therefore, the fiber sensing unit 331 calculates the generation point of each of these backscattered lights and refers to the utility pole information shown in FIG. 2. As a result, the fiber sensing unit 331 specifies backscattered light of which the generation point coincides with the distance from the fiber sensing unit 331 to the utility pole 10 having the utility pole number A as backscattered light generated in the utility pole 10 having the utility pole number A. Further, the fiber sensing unit 331 specifies backscattered light of which the generation point coincides with the distance from the fiber sensing unit 331 to the utility pole 10 having the utility pole number B as backscattered light generated in the utility pole 10 having the utility pole number B, and specifies backscattered light of which the generation point coincides with the distance from the fiber sensing unit 331 to the utility pole 10 having the utility pole number C as backscattered light generated in the utility pole 10 having the utility pole number C.

Next, a method by which the detection unit 332 detects the deterioration state of the utility pole 10 identified by the fiber sensing unit 331 will be described hereinafter.

(1) First Method

Figure 3:
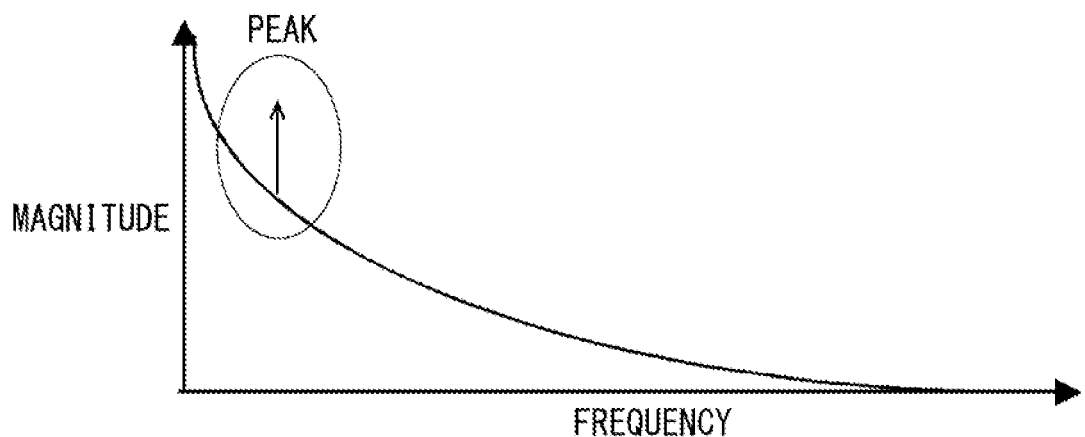
FIG. 3 is a graph showing an example of a frequency characteristic of vibration data of a utility pole which is used in a first method performed in a utility pole deterioration detection system according to an example embodiment.
Figure 4:
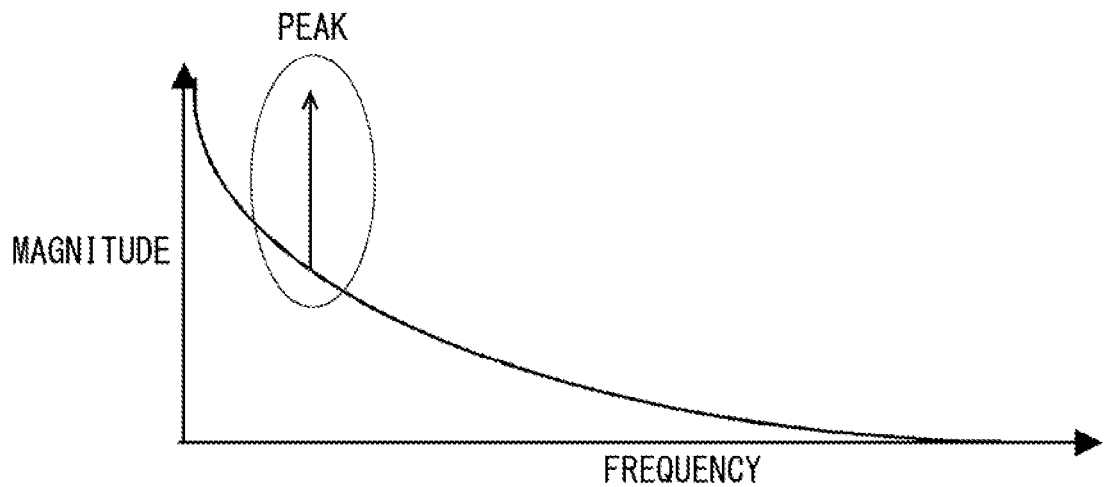
FIG. 4 is a graph showing another example of a frequency characteristic of vibration data of a utility pole which is used in the first method performed in a utility pole deterioration detection system according to an example embodiment.

Firstly, a first method for detecting the deterioration state of a utility pole 10 will be described with reference to FIGS. 3 and 4. FIGS. 3 and 4 show frequency characteristics (a horizontal axis indicates frequencies and a vertical axis indicates magnitudes (amplitudes)) of vibration data (a horizontal axis indicates time and a vertical axis indicates magnitudes (amplitudes)) of utility poles 10 after an FFT (Fast Fourier Transform) is performed for the vibration data. Further, FIG. 3 shows a frequency characteristic of a normal utility pole 10, and FIG. 4 shows a frequency characteristic of a deteriorated utility pole 10. Note that the frequency characteristics of the utility poles 10 shown in FIGS. 3 and 4 were obtained by the fiber sensing unit 331 by detecting backscattered light generated in the utility poles 10 by using a distributed acoustic sensor (Distributed Acoustic Sensor) and a distributed vibration sensor (Distributed Vibration Sensor).

As shown in FIGS. 3 and 4, a peak of the magnitude appears in the frequency characteristic of the utility pole 10. The frequency at which this peak appears changes according to the deterioration state of the utility pole 10. Specifically, the peak of the magnitude of the frequency characteristic of the deteriorated utility pole 10 (FIG. 4) is shifted to a high frequency side as compared to that in the frequency characteristic of the normal utility pole 10 (FIG. 3).

Therefore, when the detection unit 332 detects the deterioration state of a utility pole 10, it first acquires the frequency characteristic of that utility pole 10 (e.g., those shown in FIGS. 3 and 4) from the fiber sensing unit 331. Then, the detection unit 332 detects the deterioration state of the utility pole 10 based on the frequency at which the peak appears in the frequency characteristic of the utility pole 10. Further, the detection unit 332 may detect its deterioration level based on the amount of the shift from the frequency at which the peak of the normal utility pole 10 appears in the frequency characteristic thereof.

Alternatively, in the first method, the deterioration level may be detected based on the frequency characteristic of the utility pole 10 by using other methods.

For example, the deterioration level may be detected based on the difference between the shapes of waveforms in a specific frequency section, i.e., the difference between the waveform patterns in the specific frequency section.

Alternatively, peaks of a plurality of frequencies may be combined and the deterioration level may be detected based on the difference between the combined peaks.

(2) Second Method

Figure 5:
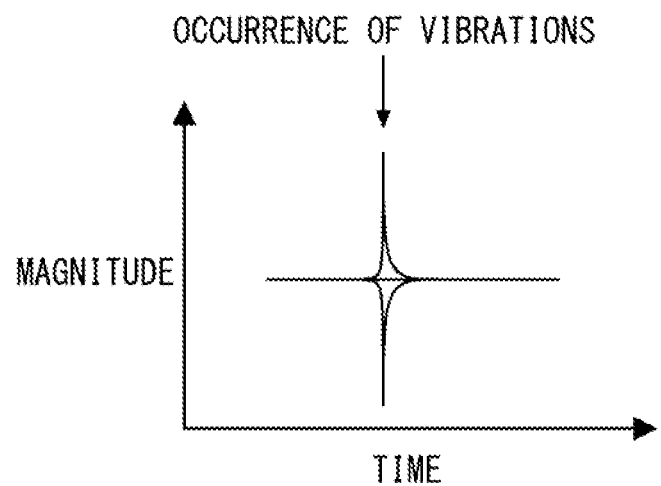
FIG. 5 is a graph showing an example of vibration data of a utility pole which is used in a second method performed in a utility pole deterioration detection system according to an example embodiment.
Figure 6:
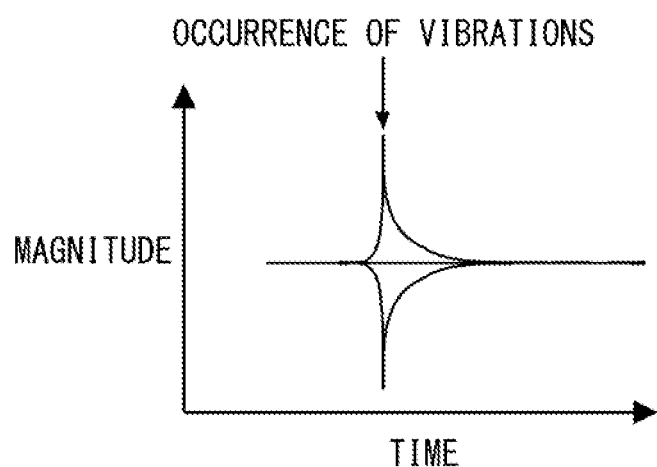
FIG. 6 is a graph showing another example of vibration data of a utility pole which is used in the second method performed in a utility pole deterioration detection system according to an example embodiment.

Next, a second method for detecting the deterioration state of a utility pole 10 will be described with reference to FIGS. 5 and 6. FIGS. 5 and 6 show vibration data (a horizontal axis indicates time and a vertical axis indicates magnitudes (amplitudes)) of utility poles 10. Further, FIG. 5 shows vibration data of a normal utility pole 10, and FIG. 6 shows vibration data of a deteriorated utility pole 10. Note that the vibration data of the utility poles 10 shown in FIGS. 5 and 6 were obtained by the fiber sensing unit 331 by detecting backscattered light generated in the utility poles 10 by using a distributed acoustic sensor and a distributed vibration sensor.

In the second method, a worker taps on a utility pole 10 with a hammer or the like and thereby artificially generates vibrations in the utility pole 10, and the generated artificial vibrations are used.

As shown in FIGS. 5 and 6, vibrations that are artificially generated in the utility poles 10 are attenuated after being generated. The attenuation time changes according to the deterioration state of the utility pole 10. Specifically, as shown in FIG. 5, in the case of the normal utility pole 10, the attenuation time of vibrations is short. In contrast, as shown in FIG. 6, in the case of the deteriorated utility pole 10, the attenuation time of vibrations is long.

Therefore, when the detection unit 332 detects the deterioration state of a utility pole 10, it first acquires the vibration data of that utility pole 10 (e.g., those shown in FIGS. 5 and 6) from the fiber sensing unit 331. Then, the detection unit 332 detects the deterioration state of the utility pole 10 based on the attenuation time of the vibrations that were artificially generated in the utility pole 10 in the vibration data of the utility pole 10. Further, the detection unit 332 may detect the deterioration level based on the length of the attenuation time.

(3) Third Method

Next, a third method for detecting the deterioration state of a utility pole 10 will be described. In the third method, the detection unit 332 performs machine learning (e.g., deep learning) for patterns that change according to the deterioration states of utility poles 10, and detects the deterioration state of a utility pole 10 by using the learning result of the machine learning (an initial training model).

Firstly, a method for performing machine learning in the third method will be described with reference to FIG. 7.

Figures 7, 8:
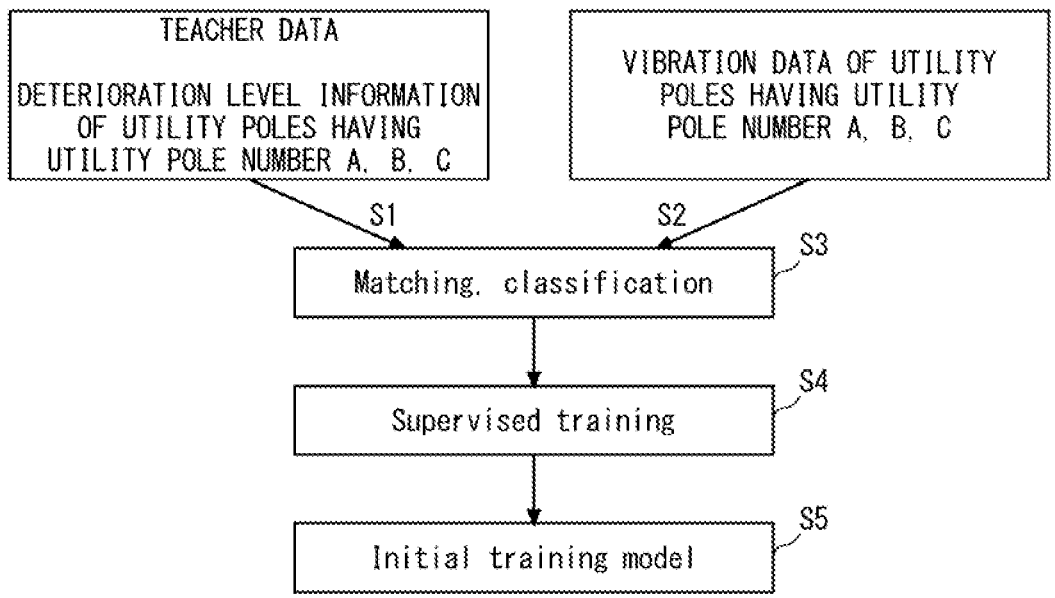
FIG. 7 shows an example of machine learning by a third method performed in a utility pole deterioration detection system according to an example embodiment.
FIG. 8 shows an example of deterioration level information according to an example embodiment.

As shown in FIG. 7, the detection unit 332 inputs teacher data, which is deterioration level information indicating the deterioration levels of utility poles 10 having utility pole numbers A, B and C, and vibration data of the utility poles 10 having the utility pole numbers A, B and C (steps S1 and S2). FIG. 8 shows an example of the deterioration level information which is used as the teacher data. Note that, in FIG. 8, it is indicated that the higher the numerical value of the deterioration level is, the more the deterioration has advanced. Further, the deterioration level information is held by the fiber sensing unit 331. Further, when the deterioration state is detected by the above-described first method, the vibration data of the utility poles 10 are those having the frequency characteristics shown in FIGS. 3 and 4. Further, when the deterioration state is detected by the above-described second method, the vibration data of the utility poles 10 are those shown in FIGS. 5 and 6.

Next, the detection unit 332 performs matching between these information and data, and classification thereof (step S3), and performs supervised training (step S4). In this way, an initial training model is obtained (step S5). This initial training model is such a model that when vibration data of a utility pole 10 is input to the initial training model, the deterioration state of that utility pole 10 is output.

Next, a method for detecting the deterioration state of a utility pole 10 in the third method will be described.

When the detection unit 332 detects the deterioration state of a utility pole 10, it acquires vibration data of that utility pole 10 (e.g., those shown in FIGS. 3 to 6) from the fiber sensing unit 331 and inputs the acquired vibration data to the initial training model. As a result, the detection unit 332 acquires the deterioration state of the utility pole 10 as a result output from the initial training model.

As described above, in the third method, machine learning for data (patterns) that changes according to the deterioration states of utility poles 10 is performed, and then the deterioration state of a utility pole 10 is detected by using the learning result of the machine learning.

In some cases, it is very difficult to extract features by which the deterioration state of a utility pole 10 is detected from data by manually analyzing the data. In the third method, it is possible, by constructing a training model from a large amount of vibration data, to accurately detect the deterioration state of a utility pole 10 even in the case where it is very difficult to manually analyze the vibration data.

Note that, in the machine learning in the third method, in the initial state, a training model may be generated based on at least two teacher data. Further, it is possible to make the generated training model newly learn vibration data of utility poles 10 that are newly collected by the fiber sensing unit 331. In this case, details of the conditions for detecting the deterioration state of a utility pole 10 may be adjusted when the new training model is used for the first time.

Next, a hardware configuration of a computer 40 that implements the utility pole deterioration detection apparatus 33 will be described with reference to FIG. 9.

Figure 9:
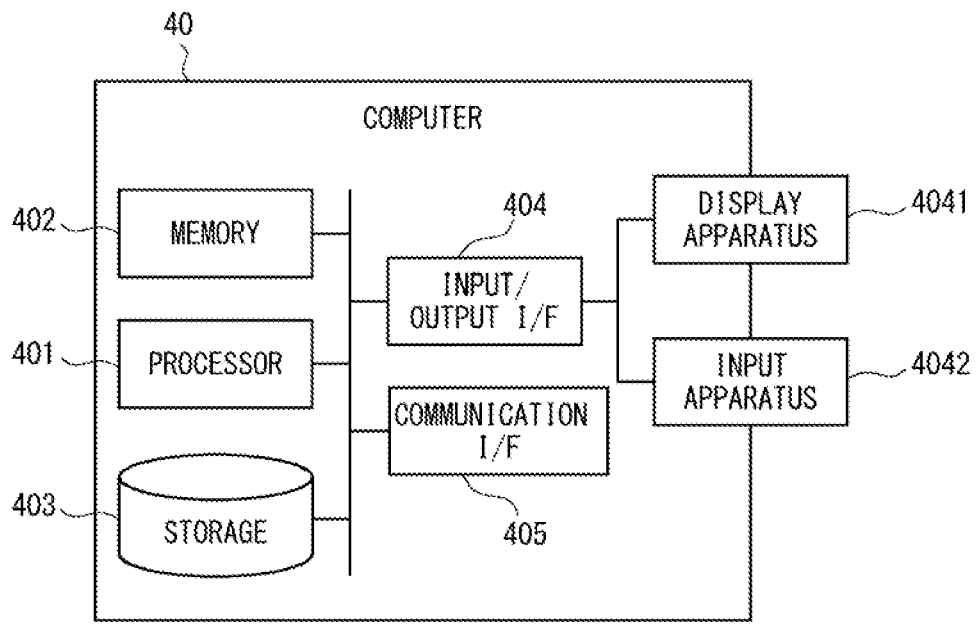
FIG. 9 is a block diagram showing an example of a hardware configuration of a computer that implements a utility pole deterioration detection apparatus according to an example embodiment.

As shown in FIG. 9, the computer 40 includes a processor 401, a memory 402, a storage 403, an input/output interface (an input/output I/F) 404, a communication interface (communication I/F) 405, and the like. The processor 401, the memory 402, the storage 403, the input/output interface 404, and the communication interface 405 are connected to each other through data transmission lines through which they transmit/receive data to/from each other.

The processor 401 is, for example, an arithmetic processing unit such as a CPU (Central Processing Unit) or a GPU (Graphics Processing Unit). The memory 402 is, for example, a memory such as a RAM (random access memory) or a ROM (Read Only Memory). The storage 403 is, for example, a storage device such as an HDD (Hard Disk Drive), an SSD (Solid State Drive), or a memory card. Further, the storage 403 may be a memory such as a RAM or a ROM.

The storage 403 stores programs for implementing the functions of the fiber sensing unit 331 and the detection unit 332 included in the utility pole deterioration detection apparatus 33. The processor 401 implements the function of each of the fiber sensing unit 331 and the detection unit 332 by executing the respective programs. Note that when the processor 401 executes these respective programs, it may execute the programs after loading them onto the memory 402 or may execute the programs without loading them onto the memory 402. Further, the memory 402 and the storage 403 also have a function of storing information and data held by the fiber sensing unit 331 and the detection unit 332.

Further, the above-described program can be stored and provided to a computer (including the computer 40) using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD-Recordable), CD-R/W (CD-ReWritable), and semiconductor memories (such as mask ROM, PROM (Programmable ROM), EPROM (Erasable PROM), flash ROM, RAM (Random Access Memory), etc.). Further, the program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The input/output interface 404 is connected to a display apparatus 4041, an input apparatus 4042, and the like. The display apparatus 4041 is an apparatus, such as an LCD (Liquid Crystal Display) or a CRT (Cathode Ray Tube) display, which displays an image corresponding to drawing data processed by processor 401. The input apparatus 4042 is an apparatus that receives an operation input from an operator, and is, for example, a keyboard, a mouse, and a touch sensor. The display apparatus 4041 and the input apparatus 4042 may be integrated with each other and hence implemented as a touch panel. Note that the computer 40 may also include sensors (not shown) including a distributed acoustic sensor and a distributed vibration sensor, and have a configuration in which these sensors are connected to the input/output interface 404.

The communication interface 405 transmits/receives data to/from an external apparatus. For example, the communication interface 405 communicates with an external apparatus through a wired communication line or a radio communication channel.

Operation in Example Embodiment

Operation performed by the utility pole deterioration detection system according to this example embodiment will be described hereinafter. Here, a flow of operations performed by the utility pole deterioration detection system according to this example embodiment will be described with reference to FIG. 10.

Figure 10:
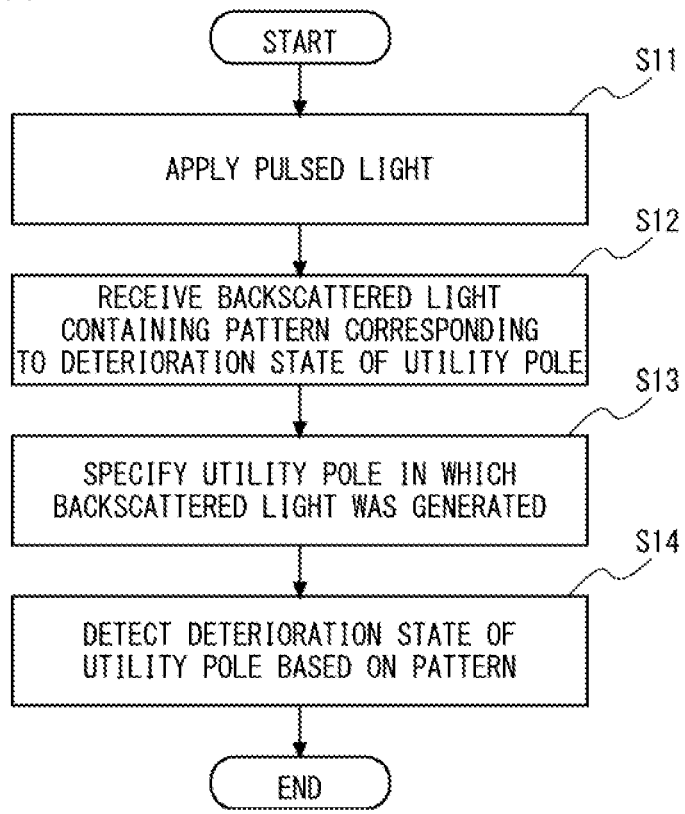
FIG. 10 is a flowchart showing an example of a flow of operations performed by a utility pole deterioration detection system according to an example embodiment.

As shown in FIG. 10, firstly, the fiber sensing unit 331 makes pulsed light enter at least one communication optical fiber contained in the optical fiber cable 20 (step S11).

Next, the fiber sensing unit 331 receives backscattered light containing a pattern that changes according to the deterioration state of a utility pole 10 from the same communication optical fiber to which the pulsed light has entered (step S12).

Next, the fiber sensing unit 331 identifies the utility pole 10 in which the backscattered light received in the step S12 was generated (step S13). Note that the fiber sensing unit 331 may identify the utility pole 10 in which the backscattered light was generated by using the above-described method based on the time difference.

After that, the detection unit 332 detects the deterioration state of the utility pole 10 identified in the step S13 based on the pattern contained in the backscattered light received in the step S12 (step S14). Note that the detection unit 332 may detect the deterioration state of the utility pole 10 by using one of the above-described first to third methods.

Note that, in FIG. 10, every time backscattered light containing a pattern that changes according to the deterioration state of a utility pole 10 is received in the step S12, the processes in the steps S13 and S14 may be performed. Alternatively, after a plurality of backscattered lights each having a pattern that changes according to the deterioration state of a utility pole 10 are received in the step S12, the processes in the steps S13 and S14 may be performed for each of the backscattered lights.

Advantageous Effect of Example Embodiment

As described above, according to this example embodiment, backscattered light (optical signals) containing a pattern that changes according to the deterioration state of a utility pole 10 is received from at least one communication optical fiber contained in the optical fiber cable 20, and the deterioration state of the utility pole 10 is detected based on that pattern. Therefore, it is possible to accurately detect the deterioration state of the utility pole 10.

Further, according to this example embodiment, it is sufficient to have an existing communication optical fiber in order to detect the deterioration state of a utility pole 10. That is, unlike Patent Literature 1, there is no need to linearly or spirally dispose an optical fiber in the vertical direction of a utility pole, and unlike Patent Literature 2, there is no need to dispose a nesting detection core line in a utility pole. Therefore, since the utility pole deterioration detection system requires no dedicated structure in order to detect the deterioration state of a utility pole 10, it can be constructed at a low cost.

Further, according to this example embodiment, it is possible to simultaneously and remotely detect the deterioration states of a plurality of utility poles 10 by using an existing communication optical fiber. Therefore, it is possible to easily detect the deterioration states of utility poles 10 and reduce the cost required to detect the deterioration states of utility poles 10.

Further, according to this example embodiment, an optical fiber sensing technique in which an optical fiber is used as a sensor is used. Therefore, for example, there are following advantages: the system is not affected by electromagnetic noises; there is no need to supply power to the sensor; the system has an excellent environmental resistance; and the maintenance thereof is easy.

Other Example Embodiments

Note that the detection unit 332 may hold, for each utility pole 10, the deterioration state of that utility pole 10 which was detected as described above, and may detect changes in the deterioration state of the utility pole 10 over time by detecting the deterioration state of the utility pole 10 at regular intervals (e.g., every year).

Further, the detection unit 332 may also detect a sign of the deterioration of the utility pole 10 or the breakage thereof based on the change in the deterioration state of the utility pole 10 over time.

Figure 11:
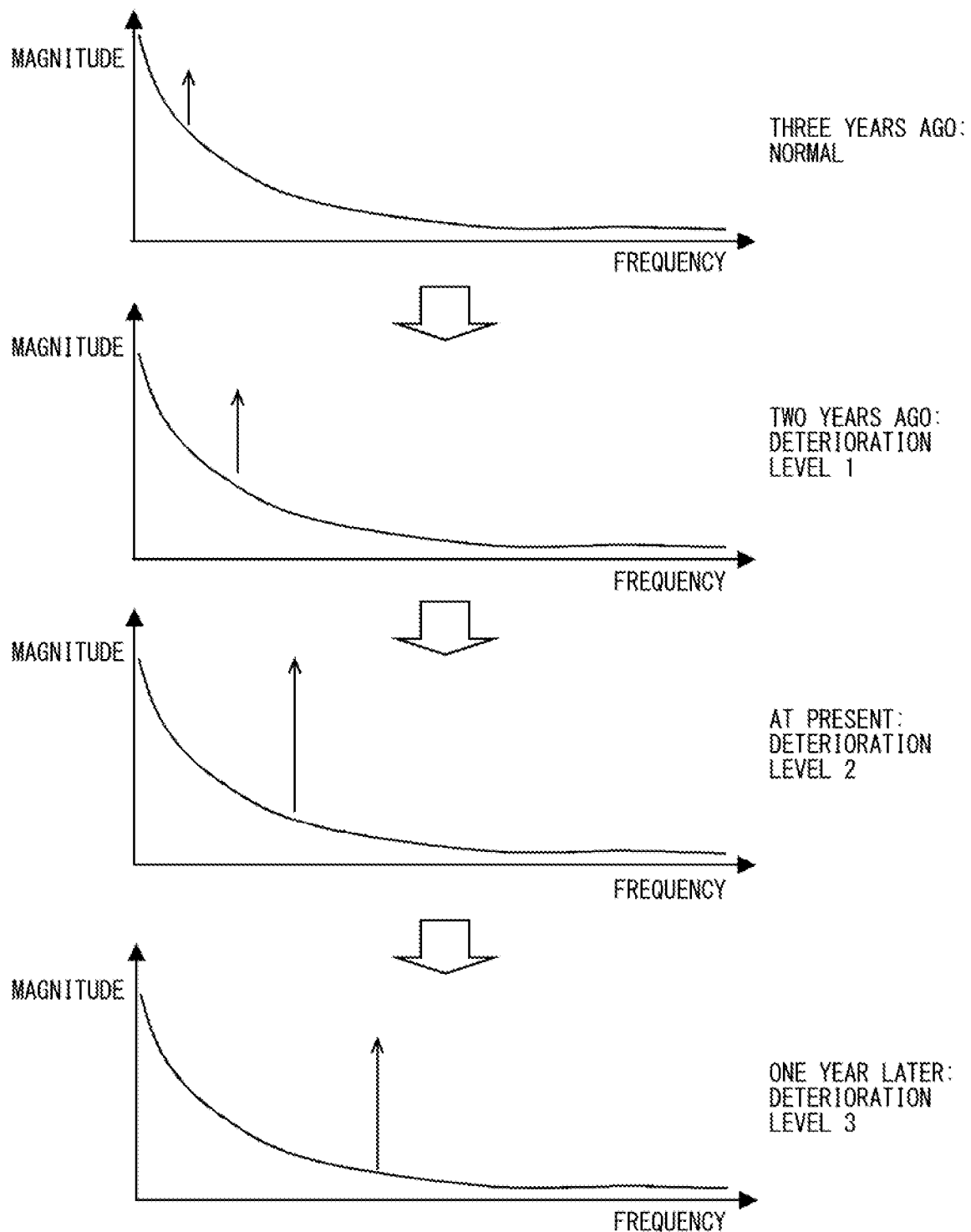
FIG. 11 shows graphs showing an example of a method for detecting a sign of deterioration or breakage of a utility pole in a utility pole deterioration detection system according to another example embodiment.

A method by which the detection unit 332 detects a sign of the deterioration or the breakage of a utility pole 10 will be described hereinafter with reference to FIG. 11. FIG. 11 shows frequency characteristics of vibration data of a utility pole 10 similar to those shown in FIGS. 3 and 4 in a chronological manner.

As shown in FIG. 11, the detection unit 332 predicts the frequency characteristic of the utility pole 10 one year later based on the changes in the frequency characteristic of vibration data thereof over time, i.e., based on the frequency characteristics three years ago, two years ago, and at present, and predicts the deterioration or the breakage of the utility pole 10 one year later based on the predicted frequency characteristic one year later. In this example, the detection unit 332 predicts that the deterioration level of the utility pole 10 will become a deterioration level 3 one year later based on the frequency at which a peak appears in the frequency characteristic thereof one year later.

Further, the fiber sensing unit 331 may further add information about each utility pole 10 to the utility pole information held by the fiber sensing unit 331 itself, and the detection unit 332 may detect the deterioration state of the utility poles 10 by using the information added to the utility pole information as well as the utility pole information. FIG. 12 shows another example of the utility pole information. In the utility pole information shown in FIG. 12, information about the material of the utility pole 10, the height thereof, and the year in which the utility pole was built is added as compared to that shown in FIG. 2. Therefore, the detection unit 332 may detect the deterioration state of a utility pole 10 while taking information about the material of the utility pole 10, the height thereof, and the year in which the utility pole was built into considerations as well as the pattern that changes according to the deterioration state of the utility pole 10 and is contained in the backscattered light. In this way, the detection accuracy can be improved.

Further, after a utility pole 10, which is detected as being deteriorated by the detection unit 332, with a new one, the old utility pole 10 may be actually disassembled and an analyst may determine the actual deterioration level. Then, if there is a difference between the deterioration level detected by the detection unit 332 and the deterioration level determined by the analyst, this difference may be fed back to the detection unit 332. In such a case, since the detection unit 332 detects the deterioration state of a utility pole 10 so that the detected deterioration level gets closer to the actual deterioration level, the detection accuracy can be improved.

Further, in the case where the detection unit 332 performs machine learning for patterns that change according to the deterioration states of utility poles 10 by the above-described third method, it is considered that the deterioration state of a utility pole 10 also changes depending on the region. For example, the deterioration states in a temperate region are different from those in a cold region. Therefore, the detection unit 332 may perform machine learning for each region by using teacher data corresponding to that region.

Figure 13:
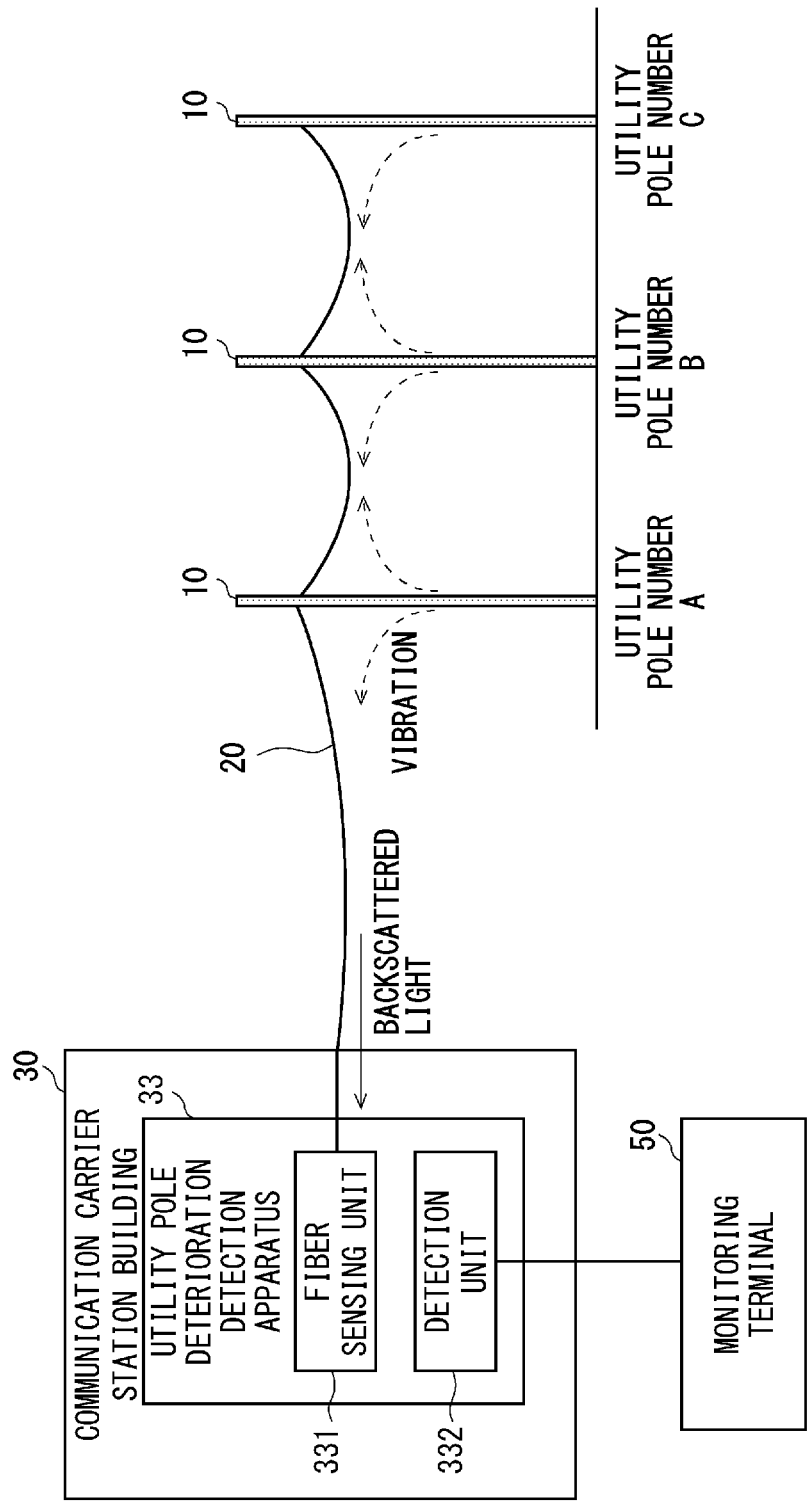
FIG. 13 shows an example of a utility pole deterioration detection system according to another example embodiment.

Further, as shown in FIG. 13, a monitoring terminal 50 that monitors the utility poles 10 based on the result of the detection by the utility pole deterioration detection apparatus 33 may be provided. The monitoring terminal 50 may show a system administrator or the like, as the result of the detection by the utility pole deterioration detection apparatus 33, the deterioration state of a utility pole 10, changes in the deterioration state of the utility pole 10 over time, a sign of the deterioration or the breakage of the utility pole 10, and the like.

Further, the monitoring terminal 50 may calculate a replacement time of the utility pole 10 or a restoration time thereof based on the result of the detection by the utility pole deterioration detection apparatus 33, and show the system administrator or the like the replacement time or the restoration time of the utility pole 10. Further, although the monitoring terminal 50 is provided outside the communication carrier station building 30 in the drawing, it may be provided inside the communication carrier station building 30. Further, when the monitoring terminal 50 is provided outside the communication carrier station building 30, utility poles 10 that are connected to a plurality of respective communication carrier station buildings 30 by optical fiber cables 20 may be monitored by one monitoring terminal 50 in a centralized manner.

Further, the fiber sensing unit 331 and the detection unit 332 of the utility pole deterioration detection apparatus 33 are disposed remotely from each other. For example, only the fiber sensing unit 331 may be provided inside the communication carrier station building 30, and the utility pole deterioration detection apparatus 33 including the detection unit 332 may be provided outside the communication carrier station building 30.

Further, in the above-described example embodiment, only one fiber sensing unit 331 is provided and it exclusively use the optical fiber cable 20. However, the present disclosure is not limited to this example. The disposition of a fiber sensing unit 331 in a utility pole deterioration detection system according to other example embodiments will be described with reference to FIGS. 14 to 17. Note that, in FIGS. 14 to 17, the illustration of the detection unit 332 is omitted.

Figure 14:
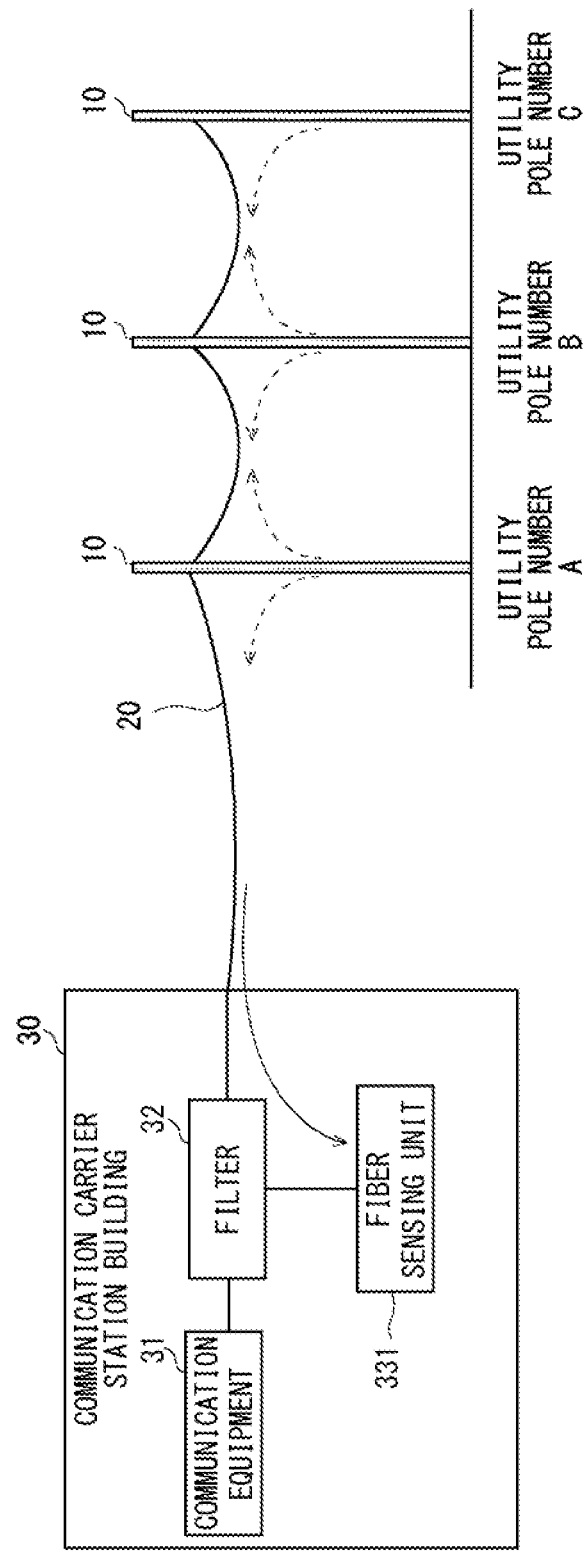
FIG. 14 shows an example of a disposition of a fiber sensing unit in a utility pole deterioration detection system according to another example embodiment.

In an example shown in FIG. 14, the fiber sensing unit 331 shares the optical fiber cable 20 with existing communication equipment 31. Further, in order to enable the fiber sensing unit 331 and the existing communication equipment 31 to share the optical fiber cable 20, a filter 32 for separating signals is provided.

Figure 15:
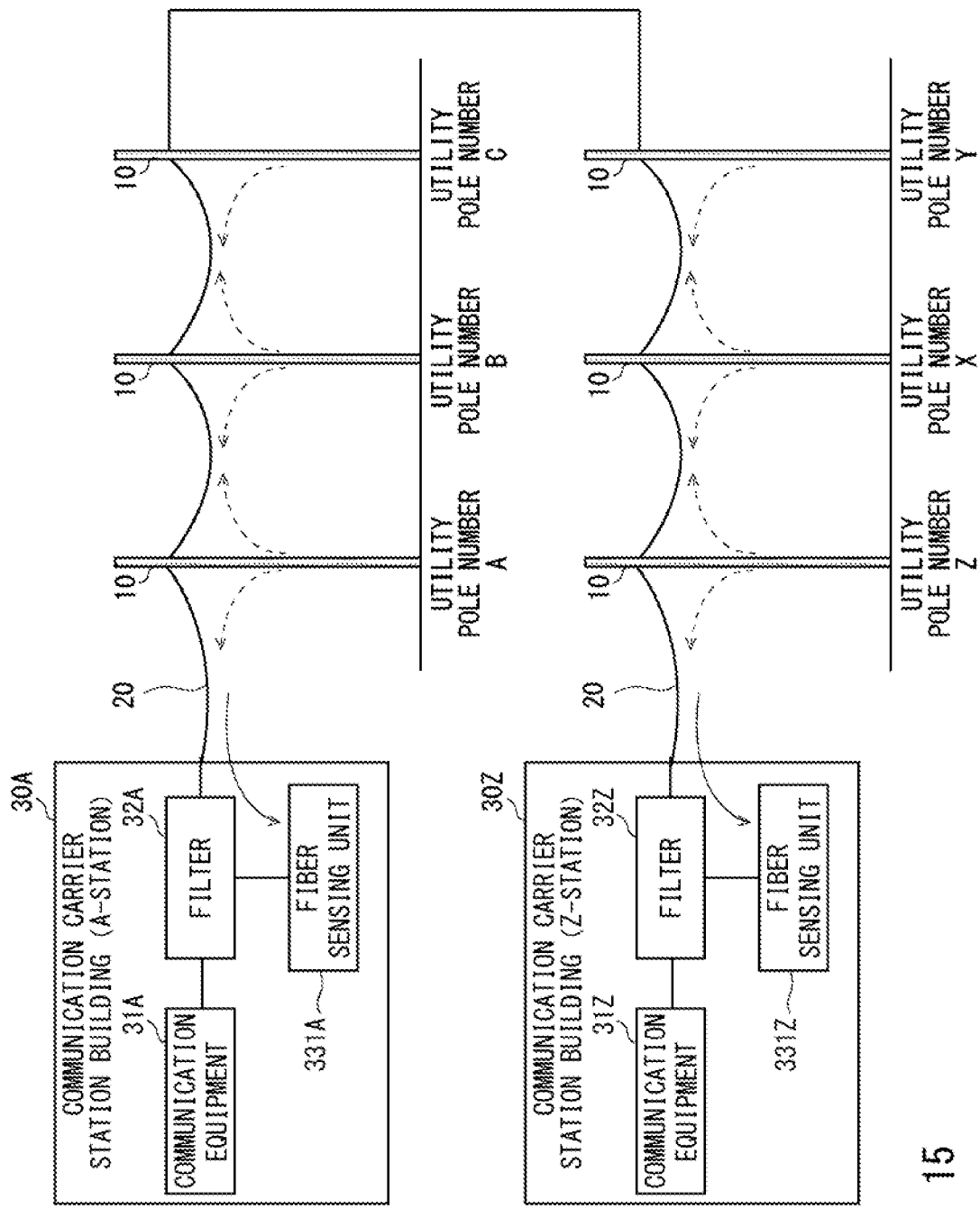
FIG. 15 shows another example of a disposition of a fiber sensing unit in a utility pole deterioration detection system according to another example embodiment.

In an example shown in FIG. 15, one fiber sensing unit 331 is provided in each of a plurality of communication carrier station buildings 30 (one fiber sensing unit 331 is provided in each of two communication carrier station buildings 30A and 30Z in FIG. 15). Specifically, fiber sensing units 331A and 331Z are provided in the communication carrier station buildings 30A and 30Z, respectively. Note that, in the example shown in FIG. 15, utility poles 10 having utility pole numbers A, B and C are connected to the communication carrier station building 30A by an optical fiber cable 20, and utility poles 10 having utility pole numbers X, Y and Z are connected to the communication carrier station building 30Z by another optical fiber cable 20. Further, the utility poles 10 having the utility pole numbers C and Y are connected to each other by another optical fiber cable 20. The communication equipment 31A and 31Z correspond to the communication equipment 31, and the filters 32A and 32Z correspond to the filter 32.

In the example shown in FIG. 15, both the fiber sensing units 331A and 331Z monitor the utility poles 10 having the utility pole numbers A, B, C, X, Y and Z.

Figure 16:
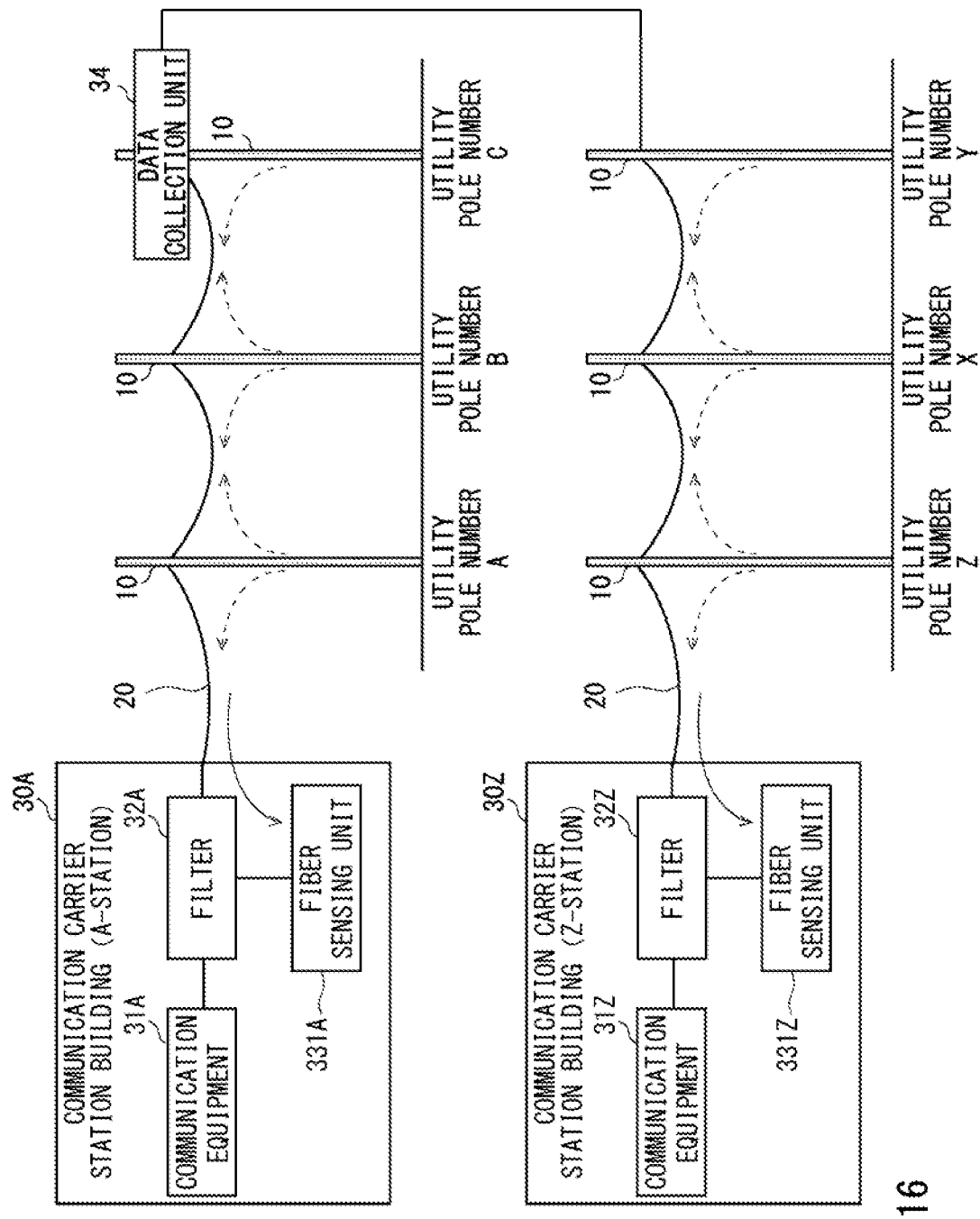
FIG. 16 shows a yet another example of a disposition of a fiber sensing unit in a utility pole deterioration detection system according to another example embodiment.

In an example shown in FIG. 16, a data collection unit 34 is provided in a utility pole 10 having a utility pole number C as compared to the example shown in FIG. 15. Note that since the number of utility poles 10 is six, only one data collection unit 34 is provided. However, one data collection unit 34 may be provided for a predetermined number of utility poles 10 (e.g., for ten utility poles 10). That is, at least one data collection unit 34 may be provided. For example, in the case where the optical fiber cable 20 is strung (e.g., stretched) through 100 utility poles 10, one data collection unit 34 may be provided for every ten utility poles 10. That is, ten data collection units 34 may be provided in total.

In the example shown in FIG. 16, each of the data collection units 34 collects data about patterns (sounds, temperatures, vibrations, etc.) of a predetermined number of corresponding utility poles 10, and the detection unit 332 summarizes the data collected by all the data collection units 34. Note that the data may be transmitted from each of the data collection units 34 to the detection unit 332 through the optical fiber cable 20, or may be transmitted through a separately provided radio apparatus. The detection unit 332 detects the deterioration states of utility poles 10, of which the data collection unit(s) 34 has collected data, based on their data.

Therefore, the section that is monitored by one fiber sensing unit 331 is shortened, and the number of utility poles 10 that are monitored by one fiber sensing unit 331 is reduced. Since the section monitored by the fiber sensing unit 331 is shortened, the distance of the transmission of the pulsed light and the backscattered light is also shortened, so that the loss caused by the fiber is reduced. As a result, the S/N ratio (the signal-to-noise ratio) of the received backscattered light is improved, so that the monitoring accuracy can be improved. Further, since the number of utility poles 10 monitored by the fiber sensing unit 331 is reduced, the monitoring cycle can be improved.

Figure 17:
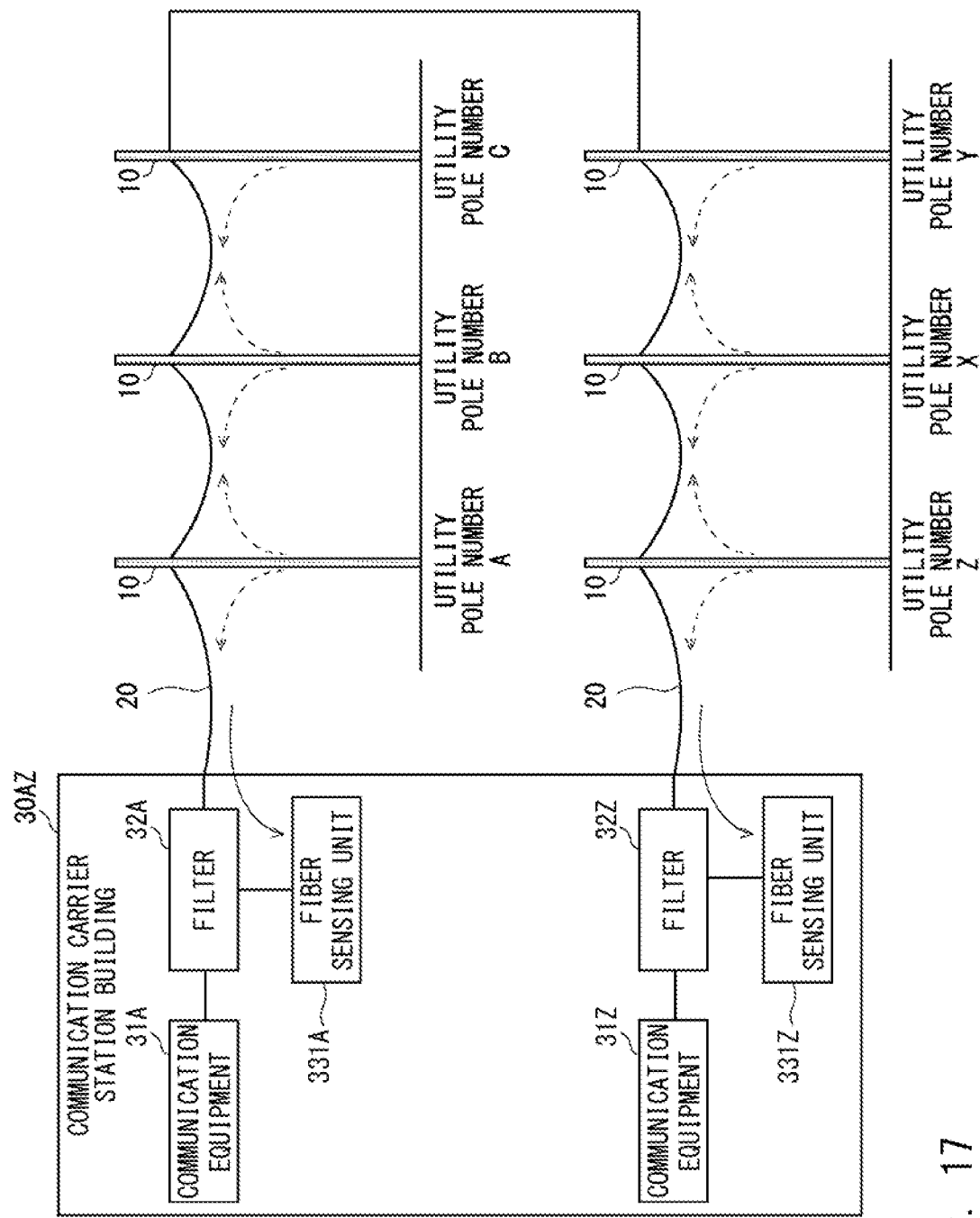
FIG. 17 shows a yet another example of a disposition of a fiber sensing unit in a utility pole deterioration detection system according to another example embodiment.

In an example shown in FIG. 17, a plurality of fiber sensing units 331 (two fiber sensing units 331A and 331Z in FIG. 17) are provided in one communication carrier station building 30AZ. Note that, in the example shown in FIG. 17, utility poles 10 having utility pole numbers A, B and C are connected to the fiber sensing unit 331A by an optical fiber cable 20, and utility poles 10 having utility pole numbers X, Y and Z are connected to the fiber sensing unit 331Z by another optical fiber cable 20. Further, the utility poles 10 having the utility pole numbers C and Y are connected to each other by another optical fiber cable 20. The communication equipment 31A and 31Z correspond to the communication equipment 31, and the filters 32A and 32Z correspond to the filter 32.

In the example shown in FIG. 17, both the fiber sensing units 331A and 331Z monitor the utility poles 10 having the utility pole numbers A, B, C, X, Y and Z. However, the fiber sensing unit 331A monitors the utility poles 10 by making pulsed light enter the optical fiber in a clockwise direction, and the fiber sensing unit 331Z monitors the utility poles 10 by making pulsed light enter the optical fiber in a counter-clockwise direction.

Note that in the case where a plurality of fiber sensing units 331 are provided as shown in FIGS. 15 to 17, one utility pole deterioration detection apparatus 33 including a detection unit 332 may be provided for the plurality of fiber sensing units 331. Further, the deterioration states of utility poles 10 that are connected to a plurality of respective fiber sensing units 331 by optical fiber cables 20 may be detected by one utility pole deterioration detection apparatus 33 in a centralized manner. In this case, the utility pole deterioration detection apparatus 33 may be provided in the inside of one of the communication carrier station buildings 30, or may be provided outside the communication carrier station buildings 30.

Further, there is a possibility that the optical fiber cable 20 strung (e.g., stretched) through the utility poles 10 is broken. Therefore, operations that are performed by the fiber sensing unit 331 when the optical fiber cable 20 is broken in a utility pole deterioration detection system according to other example embodiments will be described with reference to FIGS. 18 to 20. Note that, in FIGS. 18 to 20, the illustration of the detection unit 332 is omitted.

Figure 18:
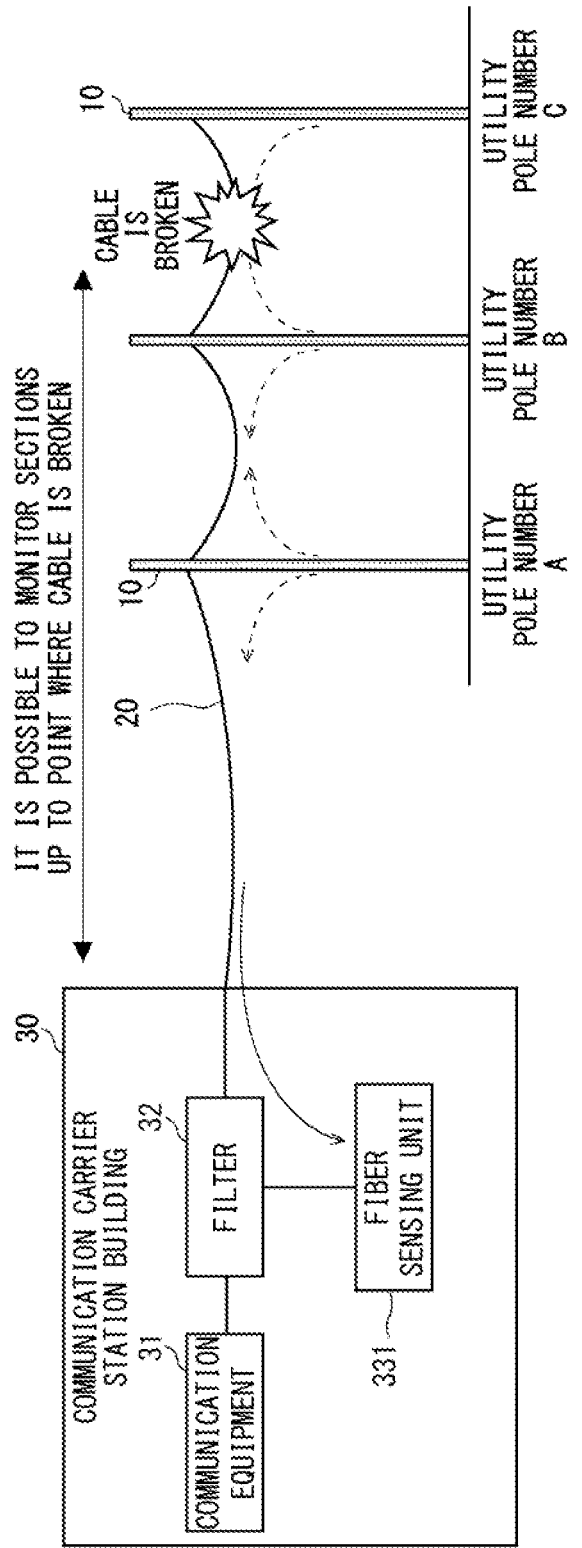
FIG. 18 shows an example of an operation that is performed by the fiber sensing unit when an optical fiber cable is broken in the utility pole deterioration detection system shown in FIG. 14.

An example shown in FIG. 18 is an example in which a part of the optical fiber cable 20 located between the utility poles 10 having the utility pole numbers B and C is broken in the configuration shown in FIG. 14. The fiber sensing unit 331 continues making the pulsed light enter the optical fiber cable 20 even when the optical fiber cable 20 is broken. In this way, the communication carrier station building 30 can continuously monitor the sections up to the place where the optical fiber cable is broken.

Figure 19:
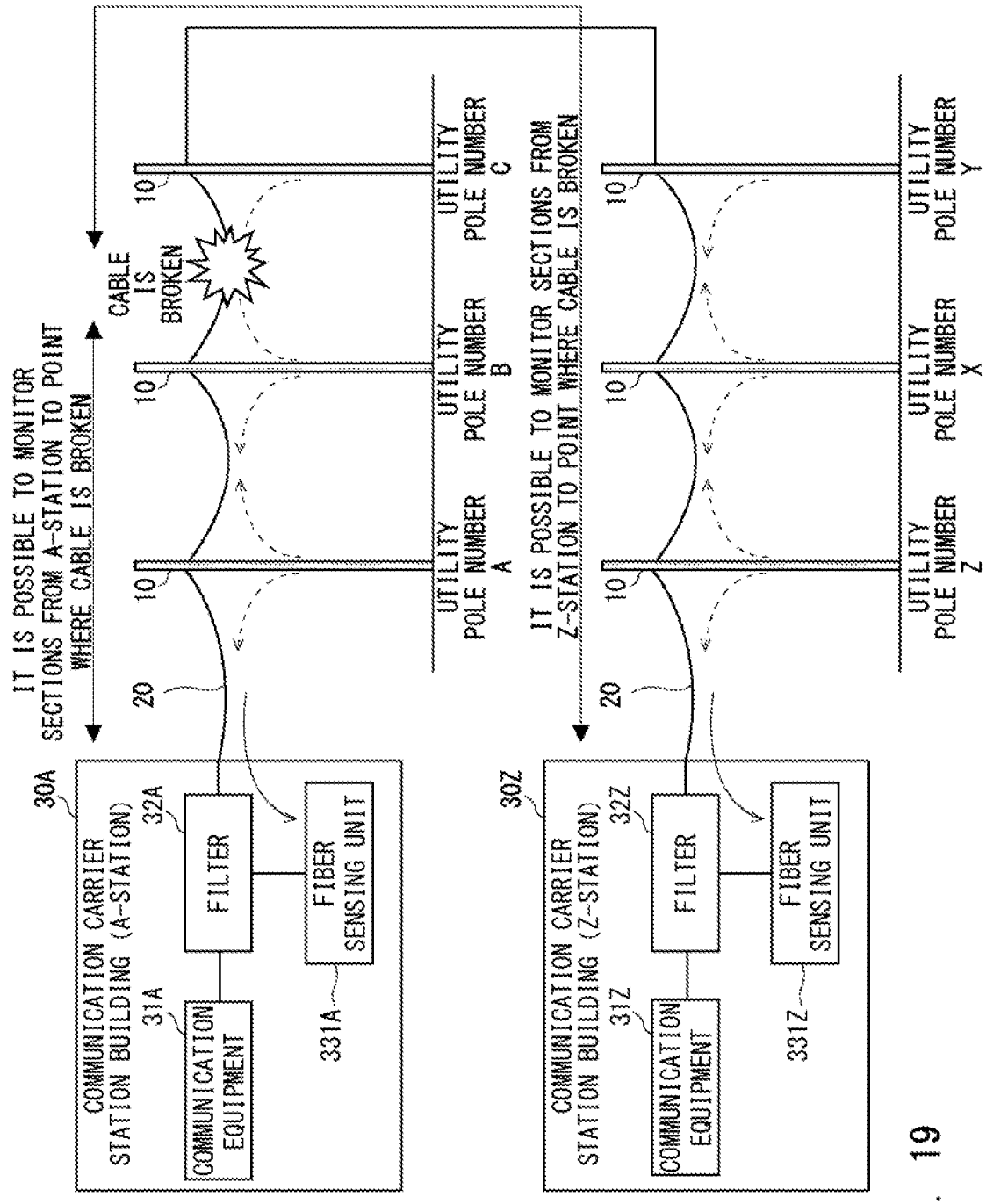
FIG. 19 shows an example of an operation that is performed by the fiber sensing unit when an optical fiber cable is broken in the utility pole deterioration detection system shown in FIG. 15.

An example shown in FIG. 19 is an example in which a part of the optical fiber cable 20 located between the utility poles 10 having the utility pole numbers B and C is broken in the configuration shown in FIG. 15. The fiber sensing units 331A and 331Z continues making the pulsed light enter the optical fiber cable 20 even when the optical fiber cable 20 is broken. Note that each of the utility poles 10 is connected to at least two communication carrier station buildings 30 (two communication carrier station buildings 30A and 30Z in FIG. 19) without exception. Therefore, by having the communication carrier station buildings 30A and 30Z monitor the utility poles in both the directions, it is possible to form a redundant configuration by which all the sections can be continuously monitored in the case of a single failure.

Figure 20:
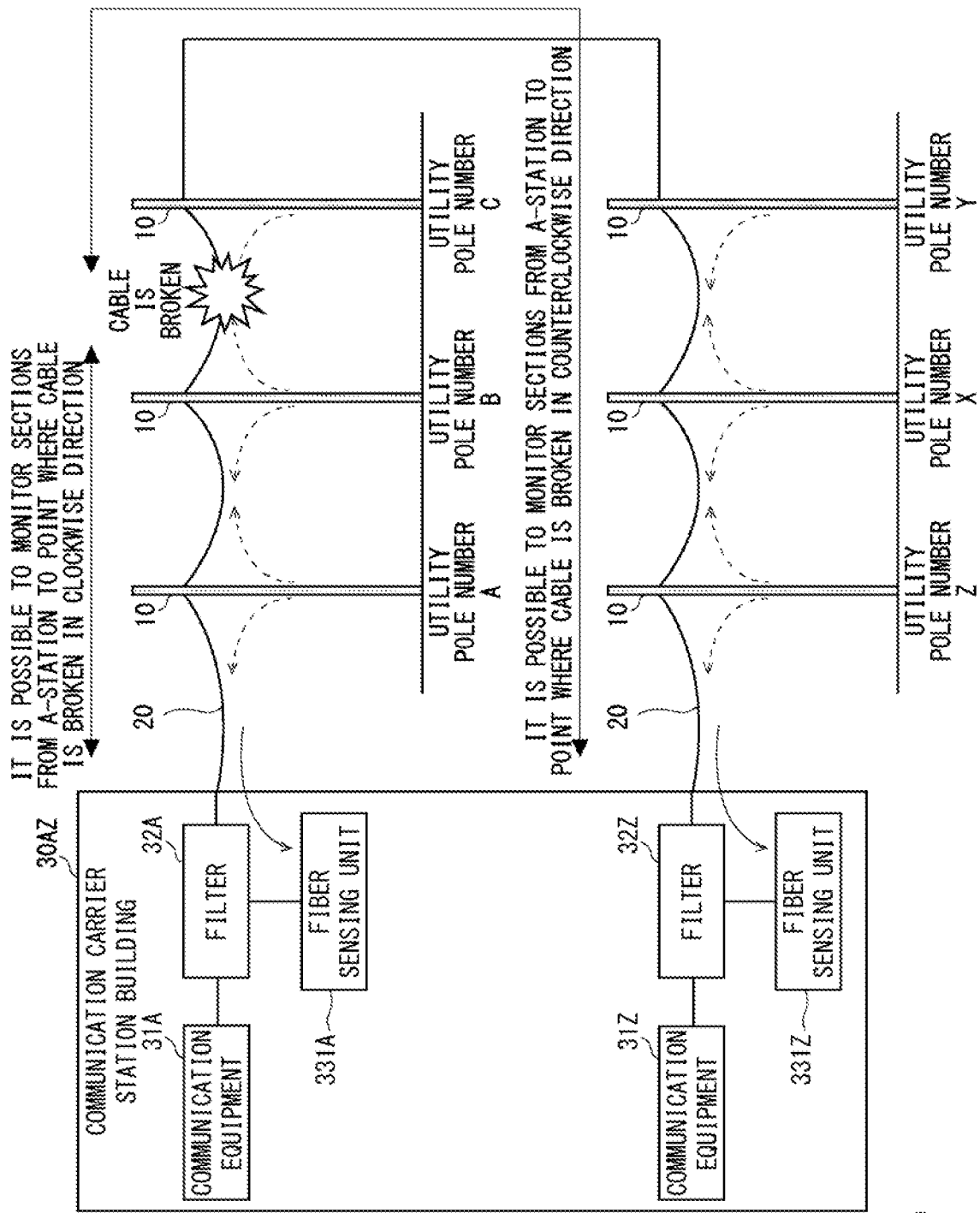
FIG. 20 shows an example of an operation that is performed by the fiber sensing unit when an optical fiber cable is broken in the utility pole deterioration detection system shown in FIG. 17.

An example shown in FIG. 20 is an example in which a part of the optical fiber cable 20 located between the utility poles 10 having the utility pole numbers B and C is broken in the configuration shown in FIG. 17. The fiber sensing units 331A and 331Z continues making the pulsed light enter the optical fiber cable 20 even when the optical fiber cable 20 is broken. Note that, in the example shown in FIG. 20, a ring configuration in which the optical fiber cables 20 are connected in a ring shape is formed. Therefore, by having the one communication carrier station building 30AZ monitor the utility poles in both the directions of the ring, it is possible to form a redundant configuration by which all the sections can be continuously monitored in the case of a single failure.

Although the present disclosure is explained above with reference to embodiments, the present disclosure is not limited to the above-described embodiments. Various modifications that can be understood by those skilled in the art can be made to the configuration and details of the present disclosure within the scope of the invention.

The whole or part of the embodiments disclosed above can be described as, but not limited to, the following supplementary notes.

(Supplementary Note 1)

A utility pole deterioration detection system comprising:
- a cable disposed in a utility pole, the cable containing a communication optical fiber;
- a receiving unit configured to receive an optical signal containing a pattern that changes according to a deterioration state of the utility pole from at least one communication optical fiber contained in the cable; and
- a detection unit configured to detect a deterioration state of the utility pole based on the pattern.

(Supplementary Note 2)

The utility pole deterioration detection system described in Supplementary note 1, wherein the optical signal received by the receiving unit is an optical signal received from the communication optical fiber that has passed through a plurality of utility poles.

(Supplementary Note 3)

The utility pole deterioration detection system described in Supplementary note 2, wherein
  the receiving unit identifies a predetermined utility pole in which the optical signal containing the pattern was generated, and the detection unit detects a deterioration state of the predetermined utility pole based on the pattern.

(Supplementary Note 4)

The utility pole deterioration detection system described in any one of Supplementary notes 1 to 3, wherein the detection unit detects a change in the deterioration state of the utility pole over time by detecting the deterioration state of the utility pole at regular intervals.

(Supplementary Note 5)

The electric utility pole deterioration detection system described in Supplementary note 4, wherein the detection unit detects a sign of deterioration or breakage of the utility pole based on the change in the deterioration state of the utility pole over time.

(Supplementary Note 6)

The utility pole deterioration detection system described in any one of Supplementary notes 1 to 5, wherein the detection unit learns patterns that change according to deterioration states of utility poles and detects the deterioration state of the utility pole based on a result of the learning and the pattern contained in the optical signal received by the receiving unit.

(Supplementary Note 7)

The utility pole deterioration detection system described in any one of Supplementary notes 1 to 6, wherein the cable is disposed roughly perpendicular to a longitudinal direction of the utility pole.

(Supplementary Note 8)

A utility pole deterioration detection apparatus comprising:
 a receiving unit configured to receive an optical signal containing a pattern that changes according to a deterioration state of a utility pole from at least one communication optical fiber contained in a cable disposed in the utility pole; and
 a detection unit configured to detect a deterioration state of the utility pole based on the pattern.

(Supplementary Note 9)

The utility pole deterioration detection apparatus described in Supplementary note 8, wherein the optical signal received by the receiving unit is an optical signal received from the communication optical fiber that has passed through a plurality of utility poles.

(Supplementary Note 10)

The utility pole deterioration detection apparatus described in Supplementary note 9, wherein
 the receiving unit identifies a predetermined utility pole in which the optical signal containing the pattern was generated, and
 the detection unit detects a deterioration state of the predetermined utility pole based on the pattern.

(Supplementary Note 11)

The utility pole deterioration detection apparatus described in any one of Supplementary notes 8 to 10, wherein the detection unit detects a change in the deterioration state of the utility pole over time by detecting the deterioration state of the utility pole at regular intervals.

(Supplementary Note 12)

The electric utility pole deterioration detection apparatus described in Supplementary note 11, wherein the detection unit detects a sign of deterioration or breakage of the utility pole based on the change in the deterioration state of the utility pole over time.

(Supplementary Note 13)

The utility pole deterioration detection apparatus described in any one of Supplementary notes 8 to 12, wherein the detection unit learns patterns that change according to deterioration states of utility poles and detects the deterioration state of the utility pole based on a result of the learning and the pattern contained in the optical signal received by the receiving unit.

(Supplementary Note 14)

The utility pole deterioration detection apparatus described in any one of Supplementary notes 8 to 13, wherein the cable is disposed roughly perpendicular to a longitudinal direction of the utility pole.

(Supplementary Note 15)

A utility pole deterioration detection method performed by a utility pole deterioration detection apparatus, comprising:
 receiving an optical signal containing a pattern that changes according to a deterioration state of a utility pole from at least one communication optical fiber contained in a cable disposed in the utility pole; and
 detecting a deterioration state of the utility pole based on the pattern.

(Supplementary Note 16)

A non-transitory computer readable medium storing a program for causing a computer to perform:
 a process of receiving an optical signal containing a pattern that changes according to a deterioration state of a utility pole from at least one communication optical fiber contained in a cable disposed in the utility pole; and
 a process of detecting a deterioration state of the utility pole based on the pattern.

This application is based upon and claims the benefit of priority from Japanese patent applications No. 2018-162042, filed on Aug. 30, 2018, the disclosure of which is incorporated herein in its entirety by reference.

REFERENCE SIGNS LIST

10 UTILITY POLE
20 OPTICAL FIBER CABLE
30, 30A, 30Z, 30AZ COMMUNICATION CARRIER STATION BUILDING
31, 31A, 31Z COMMUNICATION EQUIPMENT
32, 32A, 32Z FILTER
33 UTILITY POLE DETERIORATION DETECTION APPARATUS
331, 331A, 331Z FIBER SENSING UNIT
332 DETECTION UNIT
34 DATA COLLECTION UNIT
40 COMPUTER
401 PROCESSOR
402 MEMORY
403 STORAGE
404 INPUT/OUTPUT INTERFACE
4041 DISPLAY APPARATUS
4042 INPUT APPARATUS
405 COMMUNICATION INTERFACE
50 MONITORING TERMINAL

What is claimed is:

1. A utility pole deterioration detection system comprising:
 a cable disposed in a utility pole, the cable containing a communication optical fiber;
 a sensor configured to receive an optical signal containing a pattern that changes according to a deterioration state of the utility pole from the communication optical fiber contained in the cable;

a processor; and a memory storing instructions executable by the processor to:

detect a change in a deterioration state of the utility pole over time by detecting the deterioration state of the utility pole based on the pattern at regular intervals; and detect a sign of deterioration or breakage of the utility pole based on the detected change in the deterioration state of the utility pole over time.

2. The utility pole deterioration detection system according to claim 1, wherein the optical signal received by t unit sensor is an optical signal received from the communication optical fiber that has passed through a plurality of utility poles.

3. The utility pole deterioration detection system according to claim 2, wherein the sensor identifies a predetermined utility pole in which the optical signal containing the pattern was generated, and the utility pole that the deterioration state of which is detected over time is the predetermined utility pole.

4. The utility pole deterioration detection system according to claim 1, wherein the instructions are executable by the processor to further learn patterns that change according to deterioration states of utility poles and detect the deterioration state of the utility pole based on a result of the learning and the pattern contained in the optical signal received by the sensor.

5. The utility pole deterioration detection system according to claim 1, wherein the cable is disposed perpendicular to a longitudinal direction of the utility pole.

6. A utility pole deterioration detection apparatus comprising:

a sensor configured to receive an optical signal containing a pattern that changes according to a deterioration state of a utility pole from a communication optical fiber contained in a cable disposed in the utility pole;

a processor; and a memory storing instructions executable by the processor to:

a detect a change in a deterioration state of the utility pole over time by detecting the deterioration state of the utility pole based on the pattern at regular intervals; and detect a sign of deterioration or breakage of the utility pole based on the detected change in the deterioration state of the utility pole over time.

7. The utility pole deterioration detection apparatus according to claim 6, wherein the optical signal received by the sensor is an optical signal received from the communication optical fiber that has passed through a plurality of utility poles.

8. The utility pole deterioration detection apparatus according to claim 7, wherein the sensor identifies a predetermined utility pole in which the optical signal containing the pattern was generated, and the utility pole that the deterioration state of which is detected over time is the predetermined utility pole.

9. The utility pole deterioration detection apparatus according to claim 6, wherein the instructions are executable by the processor to further learn patterns that change according to deterioration states of utility poles and detect the deterioration state of the utility pole based on a result of the learning and the pattern contained in the optical signal received by the sensor.

10. The utility pole deterioration detection apparatus according to claim 6, wherein the cable is disposed perpendicular to a longitudinal direction of the utility pole.

11. A utility pole deterioration detection method performed by a utility pole deterioration detection apparatus, comprising:

receiving an optical signal containing a pattern that changes according to a deterioration state of a utility pole from a communication optical fiber contained in a cable disposed in the utility pole;

detecting a change in a deterioration state of the utility pole over time by detecting the deterioration state of the utility pole based on the pattern at regular intervals; and detecting a sign of deterioration or breakage of the utility pole based on the detected change in the deterioration state of the utility pole over time.

* * * * *